United States Patent [19]

Irwin et al.

[11] Patent Number: 4,802,216

[45] Date of Patent: Jan. 31, 1989

[54] INTERROGATOR AND TRANSPONDER TEST EQUIPMENT

[75] Inventors: David J. Irwin, Sparks; John T. Shaul, Jarrettsville, both of Md.

[73] Assignee: Allied-Signal Inc., Morris Township, Morris County, N.J.

[21] Appl. No.: 110,646

[22] Filed: Oct. 15, 1987

Related U.S. Application Data

[63] Continuation of Ser. No. 800,948, Nov. 22, 1985, abandoned.

[51] Int. Cl.[4] .......................... H04L 9/00; G01S 9/56
[52] U.S. Cl. ...................... 380/23; 342/45; 342/162
[58] Field of Search .............. 380/23, 25; 342/45, 342/42, 169

[56] References Cited

U.S. PATENT DOCUMENTS

| | | | |
|---|---|---|---|
| 3,750,163 | 7/1973 | Hecker | 343/6.5 R |
| 3,860,922 | 1/1975 | Wagner | 342/45 |
| 3,900,867 | 8/1975 | Wagner | 342/45 |
| 3,913,100 | 10/1975 | Janex | 342/42 |
| 3,949,397 | 4/1976 | Wagner et al. | 343/6.5 R |
| 4,000,491 | 12/1976 | Bishop | 342/169 |
| 4,138,678 | 2/1979 | Kirner | 342/169 |
| 4,145,690 | 3/1979 | Petitjean et al. | 343/6.5 R |
| 4,223,830 | 9/1980 | Walton | 343/6.5 R |
| 4,322,729 | 3/1982 | Honold et al. | 343/6.5 R |
| 4,418,349 | 11/1983 | Höfgen et al. | 343/6.5 R |
| 4,442,430 | 4/1984 | Schneider | 343/6.5 R |
| 6,024,538 | 5/1977 | Bishop | 342/45 |

*Primary Examiner*—Salvatore Cangialosi
*Attorney, Agent, or Firm*—Howard G. Massung

[57] ABSTRACT

Test equipment is described for testing a transponder and an interrogator positioned in close proximity to one another to cause suppression of its receivers while either transponder or interrogator is transmitting incorporating an RF receiver, detector, shift register, timing controller, modulator and RF transmitter. The invention overcomes the problem of testing an interrogator and transponder with cryptograms that must be generated or stored in the test equipment and overcomes the problem of requiring two test sets for testing the interrogator and transponder.

11 Claims, 3 Drawing Sheets

INTERROGATOR AND TRANSPONDER TEST EQUIPMENT

This application is a continuation of application Ser. No. 800,948, filed Nov. 22, 1985, now abandoned.

BACKGROUND OF THE INVENTION

1. Field of the Invention

This invention relates to test equipment and more particularly to equipment for testing an interrogator and transponder used for identification friend or foe on an aircraft.

2. Description of the Prior Art

Presently, the identification of aircraft flying in a region as friendly or unfriendly is provided by identification friend or foe (IFF) equipment. A ground station or an aircraft may send out an interrogation pulse which is received by a transponder in the interrogated aircraft which generates a reply signal in response to the interrogation pulse. The interrogation pulse and the reply pulse may be in the form of messages which contain certain information which may be enciphered in the form of a cryptogram. The cryptogram may be generated by a cryptograph coupled to the interrogator and by a cryptograph coupled to the transponder. The round trip time delay from the transmission of the interrogation pulse to the reception of the reply pulse is an indication of the distance to the interrogated aircraft. Typically, each aircraft carries an interrogator and a transponder as part of its identification friend or foe equipment. A cryptograph may be coupled to the interrogator when the use of coded messages or cryptograms is desired. Likewise, a cryptograph is coupled to the transponder for receiving coded messages or cryptograms and for generating reply messages or cryptograms. The interrogation pulse may be sent out on a first frequency, for example 1030 MHz and the reply pulse from the interrogated aircraft may be at a second frequency, for example, 1090 MHz. Typically, the interrogation pulse and reply pulse may be a train of subpulses with individual subpulses having a duration from 0.45 to 1.0 us. The interrogation pulse and/or the reply pulse may have a duration in the range from 3 to 150 us.

The interrogator and transponder as part of the IFF equipment on an aircraft may have separate antennas. The interrogator has a receiver for receiving reply messages and a transmitter for transmitting interrogation messages. The transponder has a receiver for receiving interrogation messages and a transmitter for transmitting reply messages. In order to prevent the aircraft's transponder from receiving, processing and replying to its own interrogator which would interfere with the IFF process, the interrogator provides a suppression signal to the aircraft's transponder. Likewise, when the transponder is transmitting the transponder provides a suppression signal to the interrogator to prevent the interrogator from receiving and processing the aircraft's replies. Thus, when the interrogator is transmitting the transponder is turned-off and when the transponder is transmitting the interrogator is turned-off.

Prior to take-off, an aircraft containing identification friend or foe equipment is tested by testing the interrogator and transponder separately. A transponder would be used to test the interrogator and an interrogator would be used to test the transponder. If cryptograms are used then the test equipment would need a cryptograph for the interrogator and one for the transponder. Alternatively, the test equipment could store predetermined cryptograms which would be valid at the time of testing of the identification friend or foe equipment.

It is therefore desirable to provide test equipment containing a single transmitter and receiver for testing both the interrogator and transponder of IFF equipment on an aircraft.

It is further desirable to provide a method of testing IFF equipment using cryptograms with test equipment that does not include a cryptograph or stored cryptograms.

It is further desirable to test IFF equipment on an aircraft prior to take-off with test equipment in close proximity which can handle cryptograms without needing a cryptograph.

SUMMARY OF THE INVENTION

An apparatus and method is described for testing a transponder and an interrogator positioned in close proximity to one another to cause suppression of the receivers while either transponder or interrogator is transmitting, comprising the steps of initiating the interrogator to transmit a first message, receiving the first message from the interrogator, demodulating and storing the first message, retransmitting the first message with the modulation and at the frequency received with the first message after a first time interval, at which time the transponder is operative to generate and transmit a reply message in response to receiving the first message, receiving the reply message from the transponder, demodulating and storing the reply message, retransmitting the reply message with the modulation and at the frequency received with the reply message after a second time interval, at which time the interrogator is operative to generate friend or foe signals to an indicator in response to receiving the reply message.

DESCRIPTION OF THE PREFERRED EMBODIMENT

Figure 1:
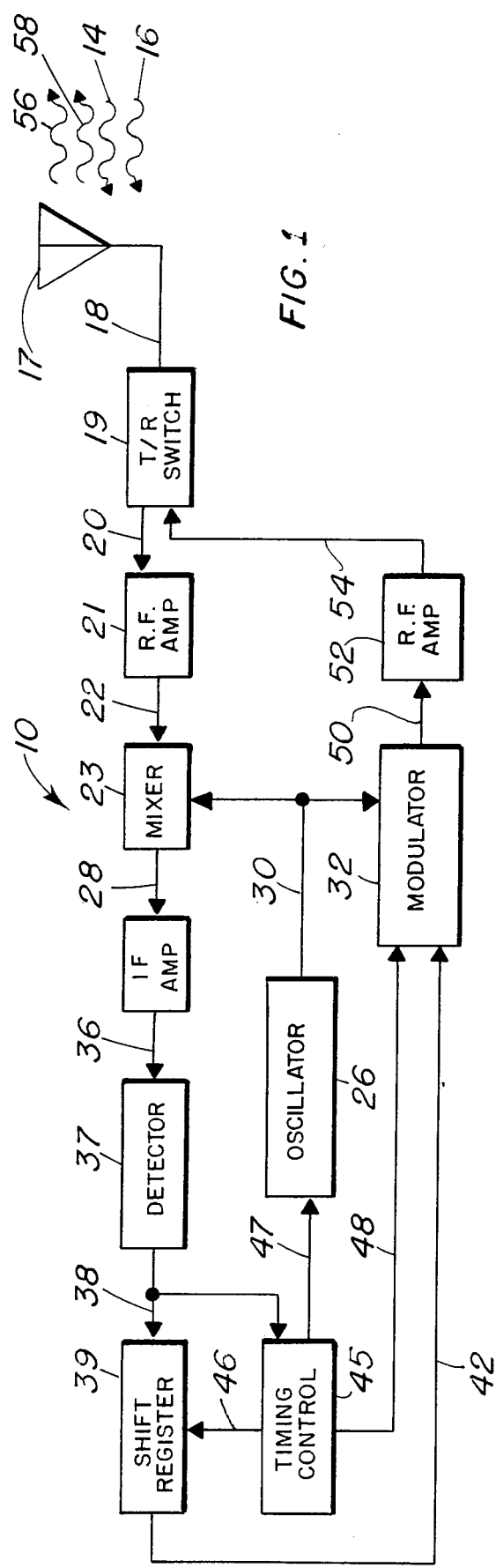
FIG. 1 is a block diagram of one embodiment of the invention.
Figure 2:
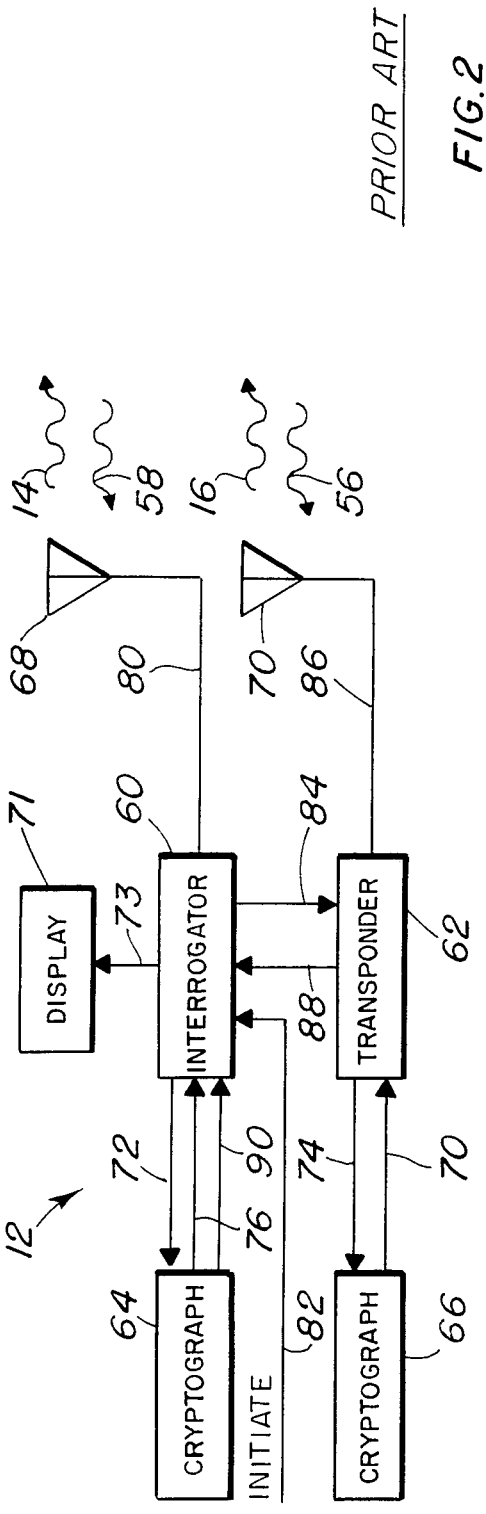
FIG. 2 is a block diagram of typical IFF equipment.

Referring to FIG. 1, test equipment 10 is shown for testing identification friend or foe (IFF) equipment 12 shown in FIG. 2. IFF equipment 12 may, for example, generate an interrogation pulse shown, for example, by arrow 14 in FIGS. 1 and 2 or a reply pulse shown by arrow 16 in FIGS. 1 and 2. Antenna 17 functions to receive the interrogation pulse or reply pulse which is coupled over line 18 through transmit/receive switch 19 over line 20 to an input of RF amplifier 21. RF amplifier 21 functions to amplify the signal on line 20 and to couple it over line 22 to an input of mixer 23. Oscillator 26 generates a frequency which is couple over line 30 to a second input of mixer 23 to be mixed with the signal on line 22 to provide an output on line 28 which is coupled to the input of IF amplifier 29. The output frequency of oscillator 26 on line 30 is selected for generating a suitable intermediate frequency on line 28.

IF amplifier 29 functions to amplify the signal on line 28 and to couple it out over line 36 to detector 37. Detector 37 functions to detect information which may be contained in the microwave signals received by antenna 17. For example, the received microwave signals may be amplitude modulated or may be phase modulated. The information detected by detector 37 is coupled over lead 38 to an input of an analog or digital shift register 39 and an input of timing control 45. Shift register 39 may be, for example, a digital shift register suitable for storing a sequence of zero and ones. The output of shift register 39 is coupled over lead 42 to an input of modulator 32. A random access memory and counter may be used in place of shift register 39.

Timing control 45 functions to decode the information on line 38 and to generate appropriate timing pulses upon receipt of information indicative of a message from IFF equipment 12. Timing control 45 has a first output coupled over lead 46 to a control input of shift register 39. Timing control 45 functions to provide a clock signal for shifting data into shift register 39 and for shifting data out over lead 42. Shift register 39 functions to store information received from IFF equipment 12. Timing control 45 has a frequency control signal couple over lead 47 to an input of oscillator 26. The frequency control signal on lead 47 functions to determine the frequency of oscillator 26. Timing control 45 also has a signal coupled over lead 48 to an input of modulator 32. Timing control signal on lead 48 functions to determine when modulator 32 shall be operating in conjunction with the data coupled over lead 42 to provide a modulated signal on lead 50 to an input of radio frequency amplifier 52. Timing control 45 allows retransmission of received signals at the end of or after the suppression signal on lead 84 or 88, shown in FIG. 2 between interrogator 60 and transponder 62. Radio frequency amplifier 52 functions to amplify the signal on lead 50 to provide an output over lead 54 to an input of transmit/receive switch 19. Transmit/receive switch 19 functions to couple the signal on lead 54 to lead 18 and to antenna 17 at times radio frequency amplifier 52 provides an output signal.

Antenna 17 radiates the microwave signals received from RF amplifier 52 via lead 18 as shown by arrows 56 and 58.

Referring to FIG. 2, IFF equipment 12 includes an interrogator 60, transponder 62, computers or cryptographs 64 and 66, antennas 68 and 70 and display 71. Computers or cryptographs 64 and 66 function to receive coded cryptograms or messages on leads 72 and 74, respectively, to verify their validity. Cryptographs 64 and 66 also function to generate cryptograms or coded messages alone or in response to the cryptogram or message received on leads 72 and 74, respectively, which are coupled out on leads 76 and 78. For example, cryptograph 64 may generate a cryptogram which is coupled over lead 76 to an input of interrogator 60, which in turn modulates an RF signal with the cryptogram to provide an output over lead 80 of a microwave signal suitable for radiation from antenna 68, as shown for example by arrow 14. Interrogator 60 may generate a message as a function of lapsed time or in response to an initiate signal coupled over lead 82. Initiate signal may be, for example, generated by a radar to indicate a period of time suitable for IFF messages.

Interrogator 60, at the time of providing an output signal on lead 80, provides a suppression signal onlead 84 to transponder 62, which functions to suppress transponder 62 to prevent transponder 62 from processing signals at times antenna 68 is radiating microwave or RF energy. Display 71 receives valid and false replies via line 73 for operator viewing.

Transponder 62 is coupled over lead 86 to antenna 70 for transmitting microwave energy and receiving microwave energy which may be shown, for example, by arrows 16 and 56, respectively. Transponder 62 functions to receive a cryptogram or message by way of antenna 70 which is detected in the receiver of transponder 62. The message may be coupled over lead 74 to cryptograph 66 for decoding to verify its validity and for generating a suitable reply cryptogram over lead 78 to transponder 62. Alternatively, transponder 62 may receive messages bearing no cryptographic or coded information, which may be interpreted by transponder 62 and transmitted by way of antenna 70. In this case interrogator 60 would generate and receive messages bearing no cryptographic or coded information and cryptographs 64 and 66 would not be required for operation of IFF equipment 12.

Transponder 62 generates a suppression signal which is coupled over lead 88 to an input of interrogator 60 to suppress interrogator 60 at times transponder 62 is transmitting RF energy to prevent interrogator 60 from processing signals from transponder 62.

In operation of the embodiment of FIG. 1, antenna 17 receives a message or cryptogram from interrogator 60 by way of electromagnetic energy shown by arrow 14. The received message is coupled over line 18 through transmit/receive switch 19 over line 20 through RF amplifier 21 and over line 22 to mixer 23. Oscillator 26 provides a mixing frequency over line 30 to provide an intermediate frequency over line 28 of the received message, which is amplified by IF amplifier 29. The output of amplifier 29 is coupled over line 36 to detector 37, which detects the analog or digital information in the received message to provide, for example, a sequence of ones and zeroes over line 38 to shift register 39 and to timing control 45 to initiate timing control 45 when a message has been received. Timing control 45 includes decode logic for identifying the message, for example the first few bits or preamble of the message may be decoded to verify a message is being received. Timing control 45 generates clock pulses over line 46, which causes the data on line 38 to be shifted into shift register 39. The message information or cryptogram is stored or delayed in shift register 39 for a period of time until timing control 45 generates additional clock pulses to shift out the data over line 42. The delay time is provided to allow retransmission of received message at the end of or after the suppression signal between transponder and interrogator (FIG. 2, line 84 or 88).

Timing control 45 via line 47 sets the frequency of oscillator 26. For example, oscillator 26 may initially have a frequency of 1090 MHz which, when mixed with an interrogation pulse from interrogator 60 at 1030 MHz, will provide an intermediate frequency at 60 MHz. After receipt of the interrogation pulse, timing control 45 may set the frequency of oscillator 26 to 1030 MHz via line 47 for retransmission of the interrogation pulse at 1030 MHz. Oscillator 26 may remain at 1030 MHz while awaiting a reply pulse from transponder 62 at 1090 MHz. When the reply pulse at 1090 MHz is mixed with the oscillator frequency at 1030 MHz the reply pulse will be at the intermediate frequency of 60 MHz. After receipt of the reply pulse, timing control 45 may set the frequency of oscillator 26 to 1090 MHz via line 47 for retransmission of the reply pulse at 1090 MHz. After retransmission, oscillator 26 may remain at 1090 MHz to receive another interrogation pulse at 1030 MHz. Under the above arrangement a single intermediate frequency of 60 MHz is used for If amplifier 29 and only two frequencies are needed from oscillator 26 which are alternated between by timing control 45.

Figure 3:
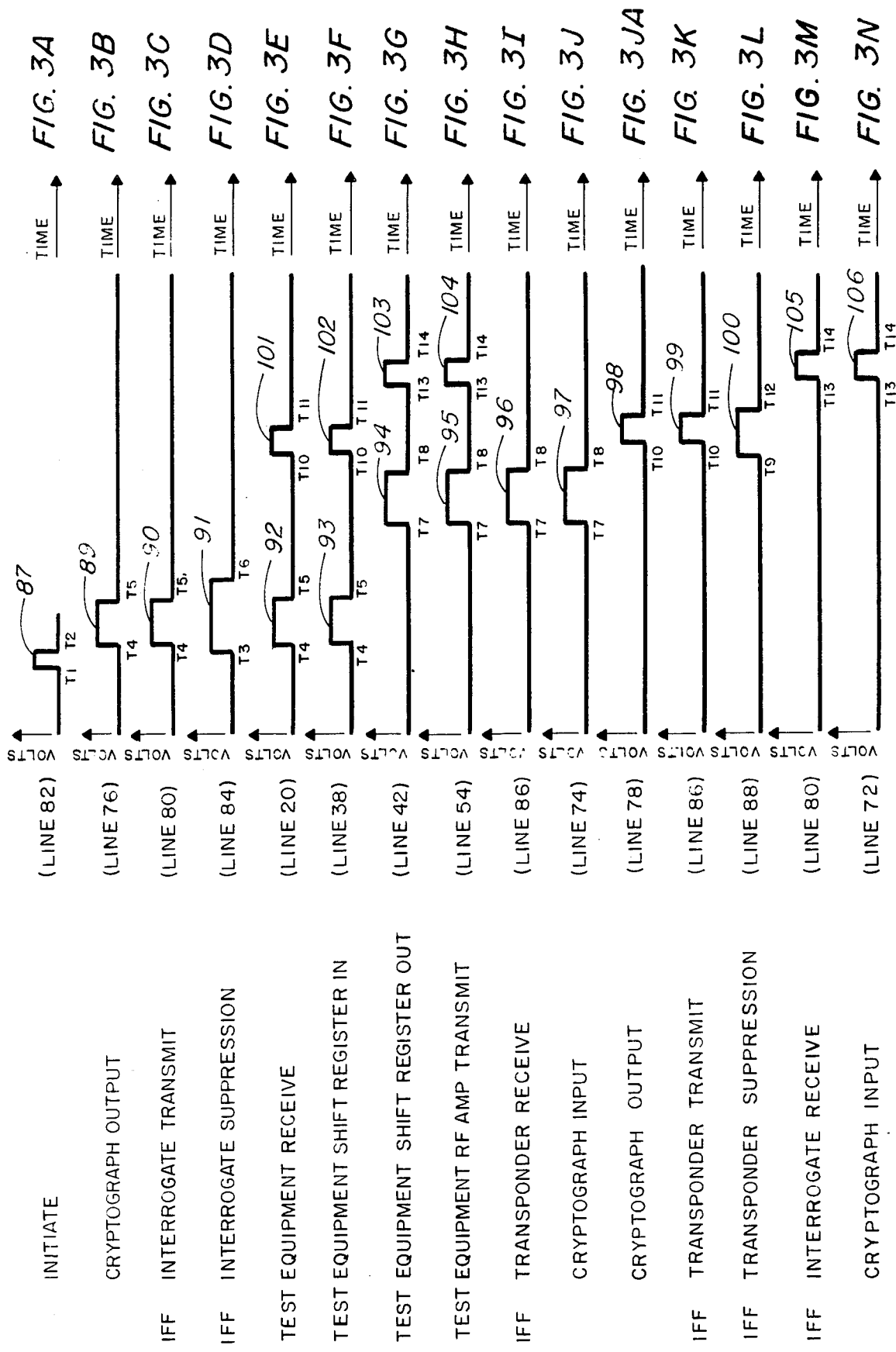
FIGS. 3A through 3N show waveforms for the proper operation of the embodiment of FIG. 1 with the IFF equipment shown in FIG. 2.

Referring to FIGS. 3A through 3N, waveforms are shown for the typical operation of test equipment 10 shown in FIG. 1 and IFF equipment 12 shown in FIG. 2. At time T1 an initiate pulse on line 82, shown by waveform 87 in FIG. 3A, causes interrogator 60 to generate an interrogation message. Cryptograph 64 provides a message over line 76 to interrogator 60 starting at time T4 and lasting to time T5 shown by waveform 89 in FIG. 3B (modulation and RF signal not shown). Interrogator 60 transmits the received cryptogram or message from time T4 through T5 over line 80 to antenna 68 shown by waveform 90 in FIG. 3C. The message or cryptogram is radiated from antenna 68 as shown by arrow 14. Prior to T4, interrogator 60 provides a suppression pulse to transducer 62 over line 84. The suppression signal extends from time T3 to T6 shown by waveform 91 in FIG. 3D.

Test equipment 10 receives the electromagnetic radiation as shown by arrow 14 over antenna 17 through transmit/receive switch 19 and over line 20. If test equipment 10 is in close proximity to IFF equipment 12, then the delay between transmission and reception of electromagnetic energy will be negligible. Waveform 92 in FIG. 3E shows the reception of a cryptogram or message on line 20 from time T4 through T5. Also at the same time shift register 39 of test equipment 10 will be loaded with data on line 38 as shown by waveform 93 in FIG. 3F from time T4 to T5.

Thus, the message transmitted by interrogator 60 is stored in shift register 39 of test equipment 10 during the time that transponder 62 of IFF equipment 12 is not processing messages due to a suppression signal over line 84.

After a predetermined time period with respect to time T4, for example, 125 us, shift register 39, in response to clock pulses from timing control 45 shifts the data out of shift registers 39 over line 42 to an input of modulator 32 shown by waveform 94 in FIG. 3G from time T7 to T8. Oscillator 26 in response to a signal from timing control 45 provides a transmitting frequency over line 30 to modulator 32. Timing control 45 also provides a signal over line 48 to modulator 32 to synchronize the modulation with the data from shift register 39. Modulator 32 provides a message over line 50 which is comparable to the message received over line 20. The output of modulator 32, line 50, is amplified by RF amplifier 52 to provide a message with sufficient RF power for transmission by antenna 17 after passing through transmit/receive switch 19. The radiated electromagnetic energy from antenna 17 is represented by arrow 56. Waveform 94 in FIG. 3G shows the output of shift register 39 from time T7 through T8 which may be a sequence of digital signals having ones and zeroes. Waveform 95 in FIG. 3H shows the output of RF amplifier 52 from time T7 through T8.

Referring to FIG. 2, transponder 62 receives by way of antenna 70 and line 86 the electromagnetic energy radiated by test equipment 10 shown by arrow 56. The reception of the message or cryptogram by transponder 62 of IFF equipment 12 is shown by waveform 96 in FIG. 3I from time T7 to T8. Transponder 62 functions to demodulate the received message and to transfer the message which may be, for example, digital over line 74 to cryptograph 66 as shown by waveform 97 in FIG. 3J from time T7 to T8.

Cryptograph 66 functions to generate a reply message after validation of the received message, which is transferred over line 78 to transponder 62 during time T10 through T11 as shown by waveform 98 in FIG. 3J. The reply message may be digital, for example, consisting of a sequence of ones and zeroes. Transponder 62 modulates the received message to generate a message suitable for radiating from antenna 70 during time T10 through T11 as shown by waveform 99 in FIG. 3K. Transponder 62 also functions to provide a suppression pulse to interrogator 60 at time T9 to T12 over line 88 shown by waveform 100 in FIG. 3L.

Thus, interrogator 60 does not process the reply message since it was suppressed during the transmission of the reply message by transponder 62.

The message transmitted by transponder 62 may be, for example, at a frequency of 1090 MHz with amplitude modulation. The radiated message may be shown, for example, in FIG. 2 by arrow 16 and also in FIG. 1 by arrow 16, with antenna 17 receiving the radiated message. The received message is decoded by detector 37 and stored in shift register 39. Waveform 101 in FIG. 3E shows the reception of the reply message during time T10 through T11. Waveform 102 in FIG. 3F shows the transfer of data into shift register 39 from time T10 to T11. The time delay between antenna 17 and the output of detector 37 is small compared to the time duration of the reply message.

After a predetermined time period, such as 10 us from time T10, timing control 45 provides signals over line 46 to clock out the data stored in shift register 39 to modulator 32 shown by waveform 103 in FIG. 3G. Timing control 45 also provides a frequency control signal over line 47 to oscillator 26 to set the frequency of its output on line 30. Timing control 45 also generates a signal on line 48 to modulator 32 to synchronize the modulation with the cryptogram or message clocked out of shift register 39. The output of modulator 32 is amplified by RF amplifier 52 during time T13 through T14 as shown by waveform 104 in FIG. 3H. The output of RF amplifier 52 is coupled through transmit/receive switch 19 to antenna 17 which radiates the reply message as shown, for example, by arrow 58 in FIG. 1.

The reply message as shown by arrow 58 in FIG. 2 is received by interrogator 60 by way of antenna 68. The reception of the reply message from time T13 to T14 is shown by waveform 105 in FIG. 3M. The reply message is demodulated by interrogator 60 and coupled over line 72 to cryptograph 64 as shown by waveform 106 in FIG. 3N during time T13 to T14. The reply message is validated by cryptograph 64 as being a valid message and provides an output over line 90 to interrogator 60 to indicate a valid reply message has been received.

Test equipment 10 introduces a delay into the interrogation message from the time test equipment 10 receives the message shown by waveform 92 in FIG. 3E to the time test equipment 10 retransmits the message shown by waveform 95 in FIG. 3H or from time T4 to T7. Test equipment 10 also introduces a delay in the reply message from the time test equipment 10 receives the message shown by waveform 101 in FIG. 3E to the time test equipment 10 retransmits the message shown by waveform 104 in FIG. 3H or from time T10 to T13. A typical time delay between time T4 to T7 may be, for example, 125 us, which is longer than the suppression signal on line 84 shown by waveform 91 in FIG. 3D. A typical time delay for the reply message from time T10 to T13 may be, for example, 10 us, which is longer than the suppression signal on line 88 shown by waveform 100 in FIG. 3L. The total delay introduced by test equipment 10 may be, for example, 135 us which corresponds to a simulated range of 10.92 mi. The total delay introduced by test equipment 10 may be longer to simulate a range of up to several hundred miles. The simulated range and the receipt of a valid reply message may be used as the acceptance test criteria for the proper operation of interrogator 60, transponder 62, cryptographs 64 and 66, and both interrogate and reply cryptograms.

The interrogation message may be transmitted at a frequency of 1030 MHz by IFF equipment 12. Test equipment 10 functions to retransmit the interrogation message at the same frequency of 1030 MHz. The reply message may be transmitted at a frequency of 1090 MHz. Test equipment 10 functions to retransmit the reply message at 1090 MHz to the IFF equipment 12.

Figure 4:
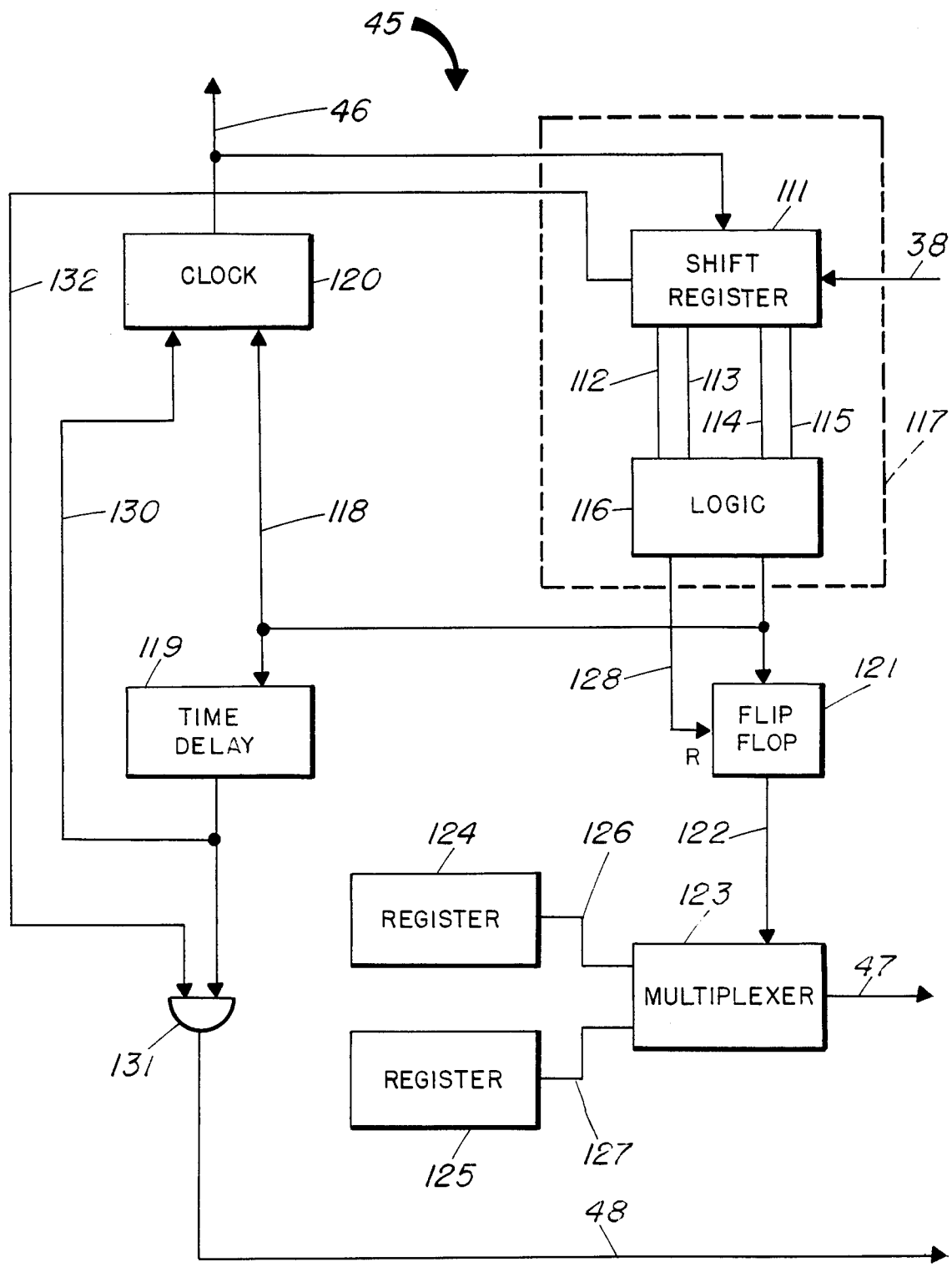
FIG. 4 is a block diagram of one embodiment of timing control 45 shown in FIG. 1.

Referring to FIG. 4, one implementation of timing control 45 is shown. Lead 38 is coupled to an input of shift register 111 which receives a clock signal over line 46. Selected bits of shift register 111 is coupled over leads 112-115 to logic 116 which functions to decode certain information, such as the preamble of an interrogation pulse or reply pulse. Shift register 111 and logic 116 function as decoder 117. One output of decoder 117 is coupled over line 118 to time delay 119. Clock 120 and flip flop 121. A second output of logic 116 is coupled over lead 128 to the reset input of flip flop 121. One output of flip flop 121 is coupled over line 122 to the control input of multiplexer 123. Registers 124 and 125 store numbers indicative of a frequency for oscillator 26 to oscillate at. Register 124 is coupled to multiplexer 123 over lead 126 and register 125 is coupled to multiplexer 123 over lead 127. The output of multiplexer 123 is coupled over lead 47 to oscillator 26.

One output of time delay 119 is coupled over lead 130 to a first input of gate 131 and to clock 120. The output of shift register 111 is coupled over lead 132 to a second input of gate 131. The output of gate 131 is coupled over lead 48 to modulator 32.

In operation, a received reply pulse or interrogation pulse is shifted into shift register 111 by a clock signal from clock 120. Logic 116 determines whether it is an interrogation or reply pulse that has been received and provides an output on line 118 to the JK clock input of flip flip 121 to provide a new frequency value over line 47. Line 118 also stops clock 120 so that data in shift register 111 is stored. After a predetermined time delay, a signal on line 130 starts clock 120 which allows stored data in shift register 111 to be coupled to gate 131 over line 132. Line 130 is also coupled to gate 131 to enable shift register data on line 132 to be passed to modulator 32 over line 48 for retransmitting the received interrogation pulse or reply pulse.

The invention describes an apparatus and method for testing a transponder and interrogator positioned in close proximity to one another to cause suppression of the receivers, while either transponder or interrogator is transmitting, comprising the steps of initiating the interrogator to transmit a first message, receiving the first message from the interrogator, demodulating and storing the first message, retransmitting the first message with the modulation and at the frequency as received with the first message after a first time period, the transponder operative to generate and transmit a reply message in response to receiving the first message, receiving the reply message from the transponder, demodulating and storing the reply message, retransmitting the reply message with the modulation and at the frequency as received with the reply message after a second time interval, the interrogator operative to generate friend or foe signals to an indicator in response to receiving the reply message.

The invention claimed is:

1. A method for testing with test equipment a transponder and an interrogator positioned in close proximity to one another and interconnected with respective suppression signals to cause suppression of its receivers while either transponder or interrogator is transmitting comprising the steps of initiating the interrogator to transmit a first message, receiving with said test equipment said first message from said interrogator, demodulating and storing said first message in said test equipment, retransmitting with said test equipment said first message with the modulation and at the frequency as received with said first message after a first time interval, said transponder operative to receive said retransmitted first message and to generate and transmit a reply message in response to receiving said retransmitted first message, receiving with said test equipment said reply message from said transponder, demodulating and storing said reply message in said test equipment, retransmitting with said equipment said reply message with the modulation and at the frequency as received with said reply message after a second time interval, said interrogator operative to receive said retransmitted reply message and to generate friend or foe signals to an indicator in response to receiving said retransmitted reply message.

2. The method of claim 1 wherein said first message is a first cryptogram.

3. The method of claim 1 wherein said step of demodulating and storing said first message includes storing said first message in said test equipment in a shift register.

4. The method of claim 1 wherein said reply message is a first cryptogram.

5. The method of claim 2 wherein said reply message is a second cryptogram.

6. The method of claim 1 wherein said first time interval exceeds the suppression signal time interval generated by the interrogator.

7. The method of claim 1 wherein said second time interval exceeds the suppression signal time interval generated by the transponder.

8. Apparatus for testing a transponder and an interrogator positioned in close proximity to one another and interconnected with respective suppression signals to cause suppression of its receivers while either transponder or interrogator is transmitting comprising, means for receiving a first message from said interrogator, means for demodulating and storing said first message, means for retransmitting said first message with the modulation and at the frequency as received with said first message after a first time inverval, said transponder operative to receive said retransmitted first message and to generate and transmit a reply message in response to receiving said retransmitted first message, means for receiving said reply message from said transponder, means for demodulating and storing said reply message, means for retransmitting said reply message with the modulation and at the frequency as received with said reply message after a second time interval, said interrogator operative to receive said retransmitted reply message and to generate friend or foe signals to an indicator in response to receiving said retransmitted reply message.

9. The apparatus of claim 8 wherein said means for demodulating and storing said first message includes a digital shift register.

10. The apparatus of claim 8 wherein said first time interval is in the range of from 50 to 150 us.

11. The apparatus of claim 8 wherein said second time interval is in the range from 10 to 25 us.

* * * * *